United States Patent [19]

Miller et al.

[11] Patent Number: 4,479,180
[45] Date of Patent: Oct. 23, 1984

[54] DIGITAL MEMORY SYSTEM UTILIZING FAST AND SLOW ADDRESS DEPENDENT ACCESS CYCLES

[75] Inventors: Leigh G. Miller, Baltimore; Joel E. Lawhon, Catonsville, both of Md.

[73] Assignee: Westinghouse Electric Corp., Pittsburgh, Pa.

[21] Appl. No.: 492,367

[22] Filed: May 11, 1983

Related U.S. Application Data

[63] Continuation of Ser. No. 156,941, Jun. 6, 1980, abandoned.

[51] Int. Cl.$^3$ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,984,818 | 10/1976 | Gnadeberg et al. | 364/200 |
| 4,079,454 | 3/1978 | Sorenson et al. | 364/200 |
| 4,080,659 | 3/1978 | Francini | 364/200 |
| 4,095,269 | 6/1978 | Kawabe et al. | 364/200 |
| 4,155,118 | 5/1979 | Lamiaux | 364/200 |
| 4,285,039 | 8/1981 | Patterson et al. | 364/200 |

Primary Examiner—Charles E. Atkinson
Assistant Examiner—Gary V. Harkcom
Attorney, Agent, or Firm—J. B. Hinson

[57] ABSTRACT

An improved addressing circuit for memory system using a plurality of integrated circuit memory arrays is disclosed. Typical integrated digital memory arrays include an address input which accepts a digital signal which identifies the storage locations in the array and an array enable input signal. In typical arrays, the time to respond to the address input signals and the array input signal is different with decoding of the array enable signal typically being considerably faster than decoding of the address signal. In the disclosed addressing scheme, the arrays comprising the system are arranged such that a first portion of the system address signal is decoded to select the array with the remainder of the address portion serving to select the storage location within the selected array. The addressing is arranged such that for a sequentially addressed data block, a word is read from each of the arrays before the address inputs to the arrays is changed. This causes the memory access time to be considerably improved because the array input enable signals are normally decoded much faster than the address inputs.

4 Claims, 5 Drawing Figures

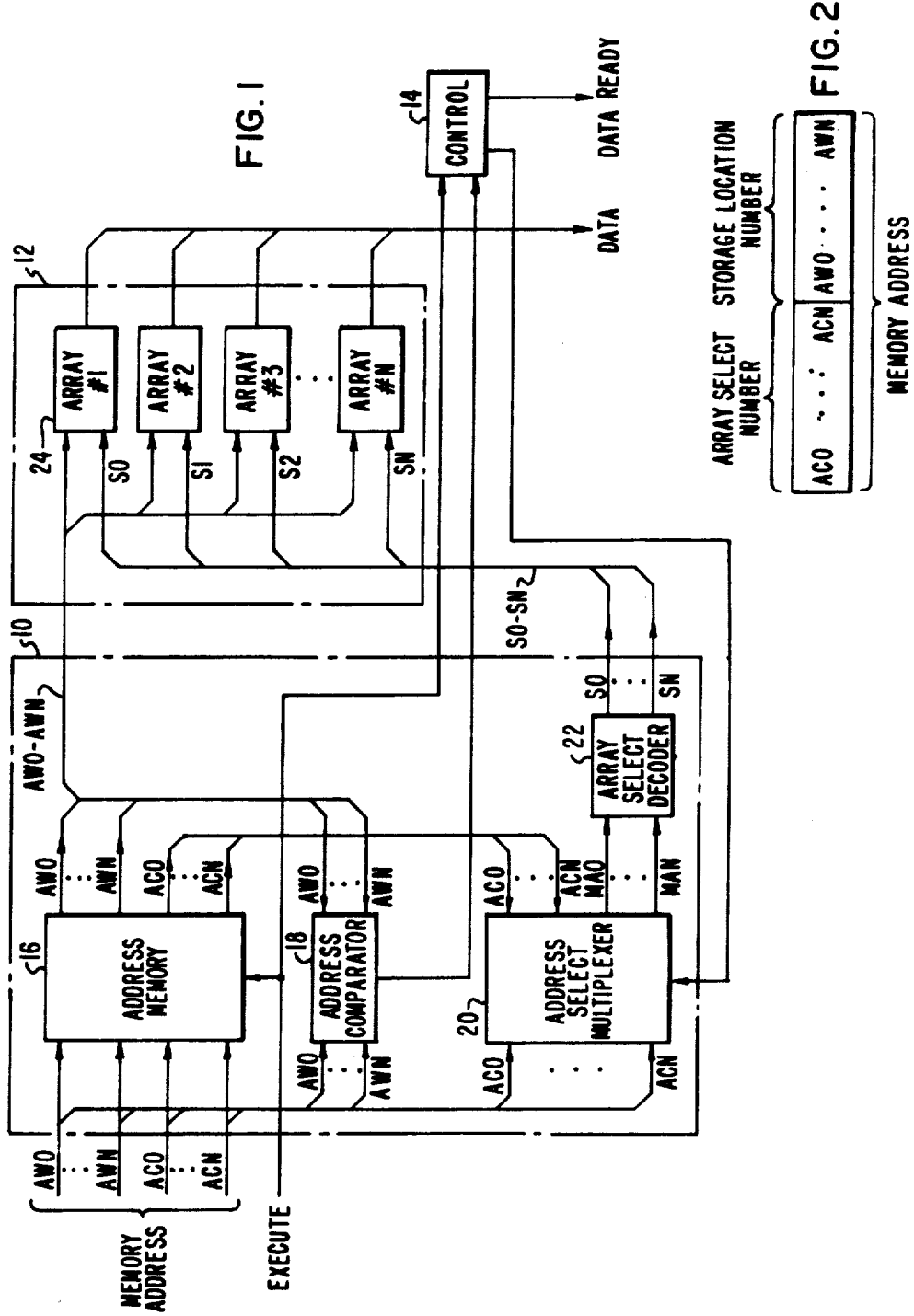

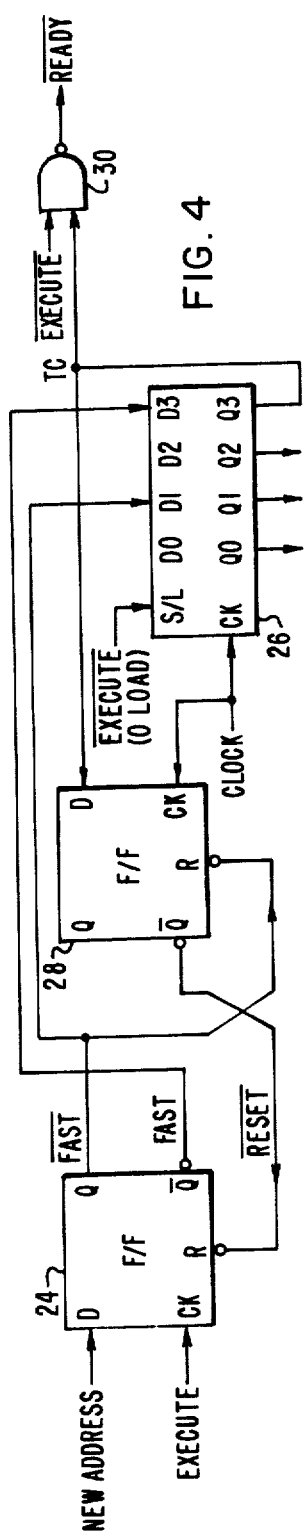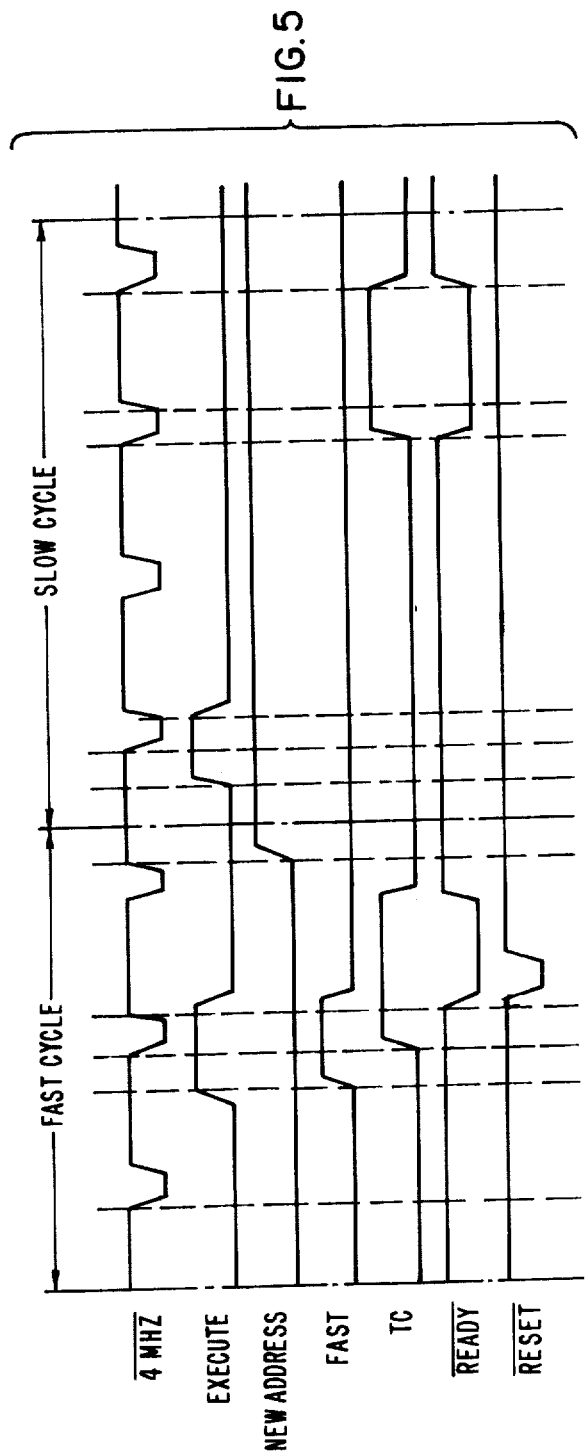

DIGITAL MEMORY SYSTEM UTILIZING FAST AND SLOW ADDRESS DEPENDENT ACCESS CYCLES

This application is a continuation of application Ser. No. 156,941, filed June 6, 1980 now abandoned.

BACKGROUND OF THE INVENTION

1. Field of the Invention

The invention relates generally to digital memories and more specifically to memory systems utilizing a plurality of integrated circuit arrays with the memory system cycle time for selected blocks of memory being reduced by utilizing the array enable input signal to minimize the decoding time for address sequences assigned to these blocks of memory.

2. Description of the Prior Art

Typical integrated circuit digital memory arrays utilize a multi-bit address signal and a single bit array enable signal. In the prior art memory systems utilizing a plurality of these integrated circuit memory arrays have utilized an addressing scheme in which all of the storage locations in each array was considered as individual blocks of memory and addressed by a continuous group of address numbers. This addressing scheme required that the address input to the array be completely decoded by the address decoder forming a part of the array each time the storage location being addressed changed. Decoding the multi-bit address signal by the decoder forming a part of the array circuitry is relatively slow due to the fact that a relatively large number of bits are involved. In these prior art systems, the single bit array enable input signal to the individual arrays was utilized to switch between blocks of memory with all of the storage locations within an individual array considered as a block. For example, the first array might be assigned addresses from zero to 1024 while the second array would be assigned sequential addresses between 1024 and 2048. Thus for the first 1024 memory storage locations the array enable input signals would remain stable with at least one bit of the multi-bit address signal to the array changing for each new memory storage location addressed. This required a complete decoding of the address for each memory cycle. Utilizing this addressing method, the effective memory access time was determined by the time required to decode the multi-bit address signal to the array containing the storage location being addressed. This address arrangement would be continued for the remainder of the arrays comprising the memory system.

SUMMARY OF THE INVENTION

The preferred embodiment of the invention comprises a digital memory system utilizing a plurality of integrated circuit digital memory arrays. Each memory array accepts a multi-bit address signal and a single bit array enable signal. An addressing scheme and circuitry is used which permits a fast memory access cycle to be executed whenever data words adjacent in time are read from different arrays. A slow memory access cycle is executed each time data words adjacent in time are read from the same array.

DESCRIPTION OF THE DRAWINGS

FIG. 1 is a block diagram of a memory system comprising the preferred embodiment of the invention;

FIG. 2 is a drawing illustrating the memory system address word format;

FIG. 4 is a diagram of the control logic utilized by the preferred embodiment of the invention;

FIG. 5 is a waveform diagram illustrating the operation of the preferred embodiment of the invention.

DETAILED DESCRIPTION

Figure 3:
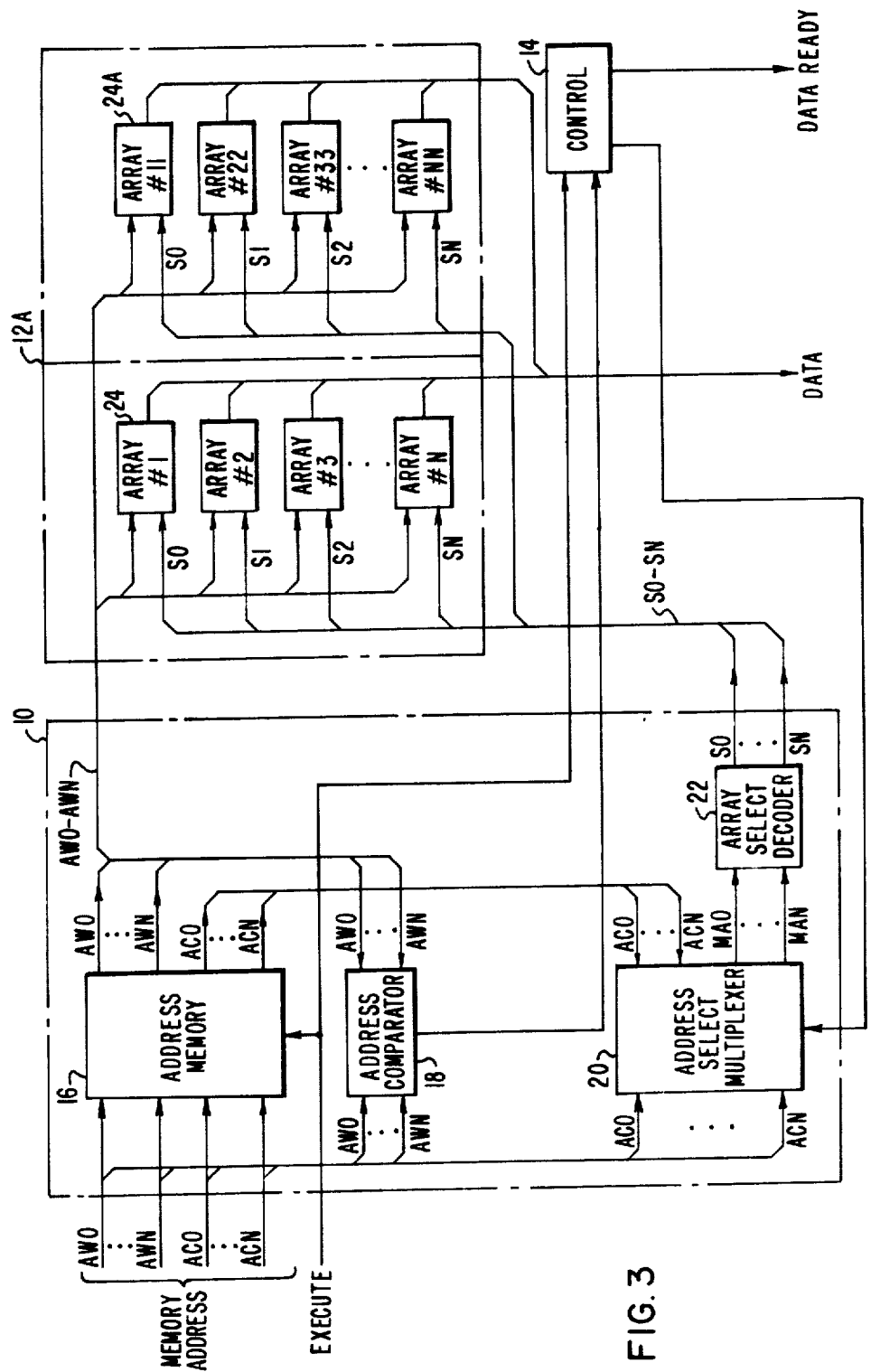
FIG. 3 is a second embodiment of the invention illustrating additional arrays which provide additional data bits to increase the word length.

Functionally, the digital memory system comprising the preferred embodiment of the invention, illustrated in FIG. 1, is divided into three basic functional circuits for ease of description. The array and storage location selection circuit 10 accepts a multi-bit digital number which is utilized as an address signal and an execute signal. These signals and some additional signals subsequently described are provided by the data system (not illustrated) utilizing the digital memory system. In response to these signals, the array and storage location selection circuit 10 separates the multi-bit address signal into a first portion which is decoded to select an array and a second portion which is decoded by the array to select a storage location within the selected array. More specifically, the least significant bits of the address signal (illustrated in FIG. 2) labeled AC0 to ACN are utilized to select an array and a second portion labeled AW0 to AWN is utilized to select a storage location within the selected array. It should also be noted that all of the arrays decode the bits AW0 through AW0. However, only one storage location is addressed.

The storage circuit utilized by the memory system is a series of integrated circuit arrays numbered 1 through N and collectively identified at reference numeral 12. Preferably, these are standard integrated circuit read only memory arrays and accept as inputs a multi-bit digital signal which is decoded by the array to select storage location within the array and an input enable signal which enables or disables the entire array. When a particular array is enabled for example, array #1, the storage location within array #1 which is specified by the address bits AW0 through AWN will be addressed and the data word stored at that storage location read. The data outputs of all the arrays are coupled to a common bus. This is permissible because only the array enabled will generate data signals at the ouput terminals.

Output signals from the memory system consist of the multi-bit data word and a data ready signal indicating to the system utilizing the memory system that the data read from the specified memory location is available. The data word, as previously discussed, comes directly from the output of the arrays #1 through #N. The data ready signal is generated by control circuitry 14 in response to the execute signal from the data system utilizing the memory system and a signal from the array and storage location select circuit 10 indicating whether or not any of the bits of the storage location number, specifically AW0 through AWN, have changed from the previous memory cycle. This is important because if all of the bits AW0 through AWN remain the same as they were during the previous memory cycle, a fast memory cycle is executed whereas if any of these bits change, a slow cycle must be executed. This operation is described in more detail below.

The array and storage location circuit 10 includes an address hold memory 16. The inputs to the address hold memory 16 are the bits of the address number with the bits labeled AC0 through ACN, AW0 through AWN and an execute signal from the system utilizing the memory. Functionally, the inputs to the address hold memory 16 must stabilize prior to the leading edge of the execute signal. On the leading edge of the execute signal, the bits of the memory address are stored in the address hold memory 16. This causes the bits of output signal of the address hold memory 16 to assume the same status the corresponding bits of the address number. The output bits of address hold memory 16 are labeled AC0 through ACN and AW0 through AWN to correspond to the nomenclature utilized in FIG. 2.

Output bits of the address signal stored in the address hold memory 16 are coupled as an input to a compare circuit 18. This circuit compares these bits to the corresponding bits of the address signal as received directly from the system utilizing the memory to detect if there has been a change in the bits corresponding to AW0 through AWN from the previous memory cycle. Since the status of the address hold memory 16 changes on the execute pulse, it is obvious that this comparison must be made after the bits of the address signal change and prior to the execute pulse. This requires that the bits of the address signal stabilized before the execute pulse with the amount of time required depending on the specific circuits used to implement the system. In general, this can be in the order of a few nanoseconds.

The bits of the address signal AC0 through ACN are also coupled as inputs to an address select multiplexer 20. The corresponding bits of the address signal from the system utilizing the memory are also coupled as inputs to this multiplexer. A control signal from the control circuit 14 determines whether the bits of the address signal AC0 through ACN or the corresponding bits from the address hold memory will be coupled to an array select decoder circuit 22. More specifically if the bits AW0 through AWN have not changed from the previous memory cycle, a fast memory cycle will be executed and the address will be utilized directly from the memory systems input. Conversely, if one of the bits AW0 through AWN have changed from the previous memory cycle, a slow cycle is utilized, causing the address signals from the address hold memory 16 to be utilized. In any case, the output signals MA0 through MAN of the address select multiplexer 20 are coupled as input signals to an array select decoder 22 which decodes these signals to generate array select signals, S0 through SN, which are mutually exclusive. That is to say that only one of the array select signals S0 through SN is a logic one with all of the other signals being logic zeroes.

The specific array select signal having a logic one level will enable the corresponding array with the bits of the address AW0 through AWN from the address hold memory 16 specifying a storage location in the array. For example, if array #1 identified by reference numeral 24 is selected, the data appearing on the output line will be the data read from the storage location within this array which is specified by the bits AW0 through AWN from the address hold memory 16. Since the least significant bits of the address signal from the system utilizing the memory are decoded in the array select decoder 22 to determine which of the arrays is selected, sequential address numbers from the system utilizing the memory will cause for example, the first word to be read from array #1, the second word to be read from array #2 with readings progressing to array N without a bit of the storage location number AW0 through AWN changing. This permits these access cycles to be relatively fast as previously discussed due to the fact that the response time to the changes in the array select signal is much faster than the address signal.

When a bit of the storage location No. AW0 through AWN changes, the output signal of the address compare circuit 18 changes indicating that a slow read cycle should be executed. This signal is coupled to the memory control circuit 14 to delay the data ready signal and to generate a signal which is coupled to the address select multiplexer 20 to indicate that the least significant bits of the address from the output of the address hold memory 16 should be utilized rather than the direct inputs. This is desirable in order not to impose additional stability requirements on the address input signals from the utilizing system. The selected address signals are coupled to the array select decoder 22 and decoded to select the array in the conventional fashion. Similarly, the bits AW0 through AWN of the storage location number are coupled from the address storage memory to the array to identify the location to be communicated with. The details of the timing of the signals generated by the control circuitry 14 will be subsequently described in more detail.

FIG. 3 is modification of the system to permit the data words to have more bits. The same reference numbers have been used in FIGS. 1 and 3 to identify the functionally similar parts. Specifically, the address hold memory 16, the address comparator 18, the address select multiplexer 20, the address decoder 22 and the control circuit 14 are identical to the similar functions illustrated in FIG. 1. Similarly, the arrays are labeled #1 through #N. The memory system illustrated in FIG. 3 includes additional memory arrays labeled #11 through NN. Functionally, the system illustrated in FIG. 3 is identical to that illustrated in FIG. 1 except that on each memory cycle a data word is read from two arrays with the output of the two arrays being combined to form one digital word. This results in a doubling of the number of bits in each data word read. Additional arrays can be added to further expand the system.

FIG. 4 is a detailed logic diagram of the control circuit 14 utilized in both FIGS. 2 and 3. The remainder of the circuitry illustrated in FIGS. 3 and 4 as well as the control circuitry can be easily implemented using standard circuits. For example, the arrays are standard integrated circuits. Similarly, the address hold circuit 16 as well as the address comparator 18, the address select multiplexer 20 and the decoder 22 may be implemented using standard circuits. The detailed diagram of the control in FIG. 4 is illustrated in order to show the basic timing of a typical memory system as well as the relationship between the various signals.

Functionally, the control circuitry in FIG. 4 requires a clock for example, a four megahertz clock and an execute signal previously described. These signals are provided by the system utilizing the memory. Functionally, a first flip-flop 124 as coupled to the D input terminal, the new address signal from the address comparator 18. Following the arrival of the first clock pulse of the four megahertz clock signal illustrated in line 1 of FIG. 5 and assuming that the new address signal is low, the fast or $\overline{Q}$ output of the first flip-flop 24 will be high as indicated in line 4 of FIG. 5. This signal is also coupled to the D3 input of a four-bit shift register 26 to set this bit to a logic one. This causes the Q3 output of this shift register to go to a logic one causing the ready signal to go to a low logic level as indicated in line 6 of FIG. 5. This signal is also coupled to the D input of a second flip-flop 28 to generate at the $\overline{Q}$ output of this flip-flop, the $\overline{\text{RESET}}$ signal indicated in line 7 of FIG. 5. This signal resets the first flip-flop 24 causing the FAST signal to go back to zero. This is a fast cycle and the speed of the various decoding circuits are sufficiently fast that the data will be available within the time when the ready signal is low. The Q3 output of the shift register 26 and the execute signal are combined in a gate circuit 30 to generate the ready signal. When the ready signal goes to a high value of the system utilizing a memory is ready to provide a new address signal to the memory system. Assuming that the new address signal contains bits in the portion selecting a storage location within one of the arrays, the new address signal indicated in line 3 of FIG. 5 will rise to a high value. This value is coupled to the D input of the first flip-flop 24 as previously described causing the Q output of this flip-flop to remain high. This signal is coupled to the D1 input of the shift register 26 set in this bit of the shift register to a logic one. This also causes the Q3 output to be low and maintains the ready signal output of gate 30 at the high value. The four megahertz clock signal then begins shifting the shift register 26 causing the Q3 output to go high on the third clock pulse thereby causing a ready signal to go low. Thus, it can be seen that in the fast cycle, the ready signal goes low on the first clock pulse following the rise of the execute signal while on the slow cycle, the ready signal goes low on the rise of the second clock pulse following the rise of the execute signal. This allows for sufficient time for the slower address decoders of the various arrays to stabilize to generate the proper data at the output of the system.

Although the invention has been illustrated with reference to a preferred embodiment which utilizes read only memory arrays, it is obvious that the invention is applicable to read/write arrays.

We claim:

1. A memory system including a plurality of arrays responsive to a multi-bit digital address signal and to a pulsed execute signal to communicate with a selected storage location within a selected one of said arrays, comprising:

(a) a plurality of memory arrays, each of said plurality of memory arrays having a plurality of selectable storage locations; an array address input port and decode logic for accepting and decoding a multi-bit digital location select signal, to select a desired storage location within the array in response to a predetermined bit pattern of said multi-bit digital location select signal; and an array enable logic signal port for accepting as an input a single bit digital array enable signal with one logic level enabling the selection of one of said selectable storage locations of the array and the other level disabling the selection of any storage location in the array;

(b) array decode logic means for accepting a multi-bit digital array select signal, said array decode logic means including means to decode said multi-bit digital array select signal to generate and couple said digital array enable signal to one array of said plurality of arrays;

(c) address compare and control means responsive to said multi-bit address signal and said pulsed execute signal to generate a digital data ready signal after a first delay period following a first selected pulse of said pulsed execute signal whenever a bit of said location select signal has changed during the time interval between said selected pulse of said pulsed execute signal and the immediately preceding pulse of said pulsed execute signal and after a second delay period following a second selected pulse of said pulsed execute signal whenever all bits of said location select signal have remained the same during the time interval between said second selected pulse of said pulsed execute signal and the immediately preceding pulse of said pulsed execute signal, said first delay period exceeding in duration said second delay period.

2. A memory system in accordance with claim 1 wherein said array decade logic means includes a digital address storage memory for storing said multi-bit address signal.

3. A memory system in accordance with claim 2 wherein said array decode logic means also includes a multiplexer and an array select decoder circuit, said multiplexer coupling a selected number of bits of said system address signal to the input of said array decode logic means when the storage location currently being addressed is in a different array from the storage location addressed during the immediately preceding memory cycle and a portion of the digital number stored in said address memory to the input of said array select decoder when a the storage location currently being addressed is in the same array as the storage location addressed during the immediately preceding memory system cycle.

4. A memory system in accordance with claim 1 wherein said plurality of memory arrays are substantially identical, at least two arrays of which are enabled and addressed in parallel, with their corresponding data output signals being coupled in parallel to a common output data bus to generate a data word having a number of bits equal to the sum of the word length of said enabled arrays.

* * * * *